(12) United States Patent
Zopf et al.

(10) Patent No.: US 10,719,115 B2
(45) Date of Patent: Jul. 21, 2020

(54) ISOLATED WORD TRAINING AND DETECTION USING GENERATED PHONEME CONCATENATION MODELS OF AUDIO INPUTS

(71) Applicant: AVAGO TECHNOLOGIES INTERNATIONAL SALES PTE. LIMITED, Singapore (SG)

(72) Inventors: Robert W. Zopf, Rancho Santa Margarita, CA (US); Bengt J. Borgstrom, Santa Monica, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 770 days.

(21) Appl. No.: 14/606,588

(22) Filed: Jan. 27, 2015

(65) Prior Publication Data
US 2016/0189706 A1    Jun. 30, 2016

Related U.S. Application Data

(60) Provisional application No. 62/098,143, filed on Dec. 30, 2014.

(51) Int. Cl.
*G06F 1/3231*        (2019.01)
*G10L 15/06*         (2013.01)
(Continued)

(52) U.S. Cl.
CPC .......... *G06F 1/3231* (2013.01); *G10L 15/063* (2013.01); *G10L 15/144* (2013.01);
(Continued)

(58) Field of Classification Search
CPC . G10L 15/24; G10L 15/142; G10L 2015/025; G10L 15/05
(Continued)

(56) References Cited

U.S. PATENT DOCUMENTS

| 5,793,891 A  * | 8/1998 | Takahashi | G10L 15/065 382/228 |
| 6,366,883 B1 * | 4/2002 | Campbell | G10L 13/07 704/258 |

(Continued)

OTHER PUBLICATIONS

How to create custom google now command for anything on andriod, Eric Ravenscraft, Jul. 30, 2014.*

*Primary Examiner* — Aurel Prifti
(74) *Attorney, Agent, or Firm* — Xsensus LLP

(57) ABSTRACT

Methods, systems, and apparatuses are described for isolated word training and detection. Isolated word training devices and systems are provided in which a user may provide a wake-up phrase from 1 to 3 times to train the device or system. A concatenated phoneme model of the user-provided wake-up phrase may be generated based on the provided wake-up phrase and a pre-trained phoneme model database. A word model of the wake-up phrase may be subsequently generated from the concatenated phoneme model and the provided wake-up phrase. Once trained, the user-provided wake-up phrase may be used to unlock the device or system and/or to wake up the device or system from a standby mode of operation. The word model of the user-provided wake-up phrase may be further adapted based on additional provisioning of the wake-up phrase.

18 Claims, 9 Drawing Sheets

(51) Int. Cl.
  *G10L 15/14* (2006.01)
  *G10L 15/02* (2006.01)
  *G10L 15/08* (2006.01)
(52) U.S. Cl.
  CPC ............ *G10L 2015/025* (2013.01); *G10L 2015/0635* (2013.01); *G10L 2015/088* (2013.01)
(58) Field of Classification Search
  USPC ..... 714/231, 10, 251, 9, 249, 236, 235, 500, 714/257, 275, 233; 704/231, 232, 234, 704/348, 256.2
  See application file for complete search history.

(56) References Cited

U.S. PATENT DOCUMENTS

| | | | | |
|---|---|---|---|---|
| 6,389,395 B1* | 5/2002 | Ringland | ............ | G10L 15/063 704/254 |
| 7,643,990 B1* | 1/2010 | Bellegarda | ............ | G10L 15/187 704/211 |
| 8,484,024 B2* | 7/2013 | Kanevsky | ............ | G10L 15/063 704/231 |
| 2003/0212556 A1* | 11/2003 | Nefian | ............ | G06K 9/00335 704/256.2 |
| 2008/0133228 A1* | 6/2008 | Rao | ............ | G10L 15/24 704/231 |
| 2008/0201133 A1* | 8/2008 | Cave | ............ | G10L 15/1815 704/10 |
| 2009/0037175 A1* | 2/2009 | Wang | ............ | G10L 15/1822 704/251 |
| 2009/0076798 A1* | 3/2009 | Oh | ............ | G06F 17/279 704/9 |
| 2009/0182559 A1* | 7/2009 | Gerl | ............ | G10L 15/08 704/235 |
| 2010/0131262 A1* | 5/2010 | Gruhn | ............ | G10L 15/144 704/8 |
| 2011/0099009 A1* | 4/2011 | Zopf | ............ | G10L 19/16 704/230 |
| 2011/0320199 A1* | 12/2011 | Luan | ............ | G10L 13/06 704/235 |
| 2012/0041947 A1* | 2/2012 | Maeda | ............ | G10L 15/26 707/722 |
| 2012/0215537 A1* | 8/2012 | Igarashi | ............ | G06F 3/167 704/249 |
| 2012/0221330 A1* | 8/2012 | Thambiratnam | ............ | G10L 25/84 704/235 |
| 2012/0323573 A1* | 12/2012 | Yoon | ............ | G09B 19/06 704/236 |
| 2012/0327243 A1* | 12/2012 | Rezvani | ............ | H04W 4/14 348/158 |
| 2013/0110521 A1* | 5/2013 | Hwang | ............ | H04W 52/028 704/500 |
| 2013/0132086 A1* | 5/2013 | Xu | ............ | G10L 15/01 704/257 |
| 2013/0191120 A1* | 7/2013 | Zopf | ............ | G10L 19/005 704/228 |
| 2013/0218568 A1* | 8/2013 | Tamura | ............ | G10L 13/033 704/260 |
| 2013/0339028 A1* | 12/2013 | Rosner | ............ | G10L 15/222 704/275 |
| 2014/0149117 A1* | 5/2014 | Bakish | ............ | G10L 15/24 704/248 |
| 2014/0278394 A1* | 9/2014 | Bastyr | ............ | G10L 21/0208 704/233 |
| 2014/0278397 A1* | 9/2014 | Chen | ............ | G10L 21/02 704/233 |
| 2014/0278435 A1* | 9/2014 | Ganong, III | ............ | G10L 15/22 704/275 |
| 2015/0161994 A1* | 6/2015 | Tang | ............ | G10L 15/02 704/232 |
| 2015/0206527 A1* | 7/2015 | Connolly | ............ | G10L 15/02 704/234 |

* cited by examiner

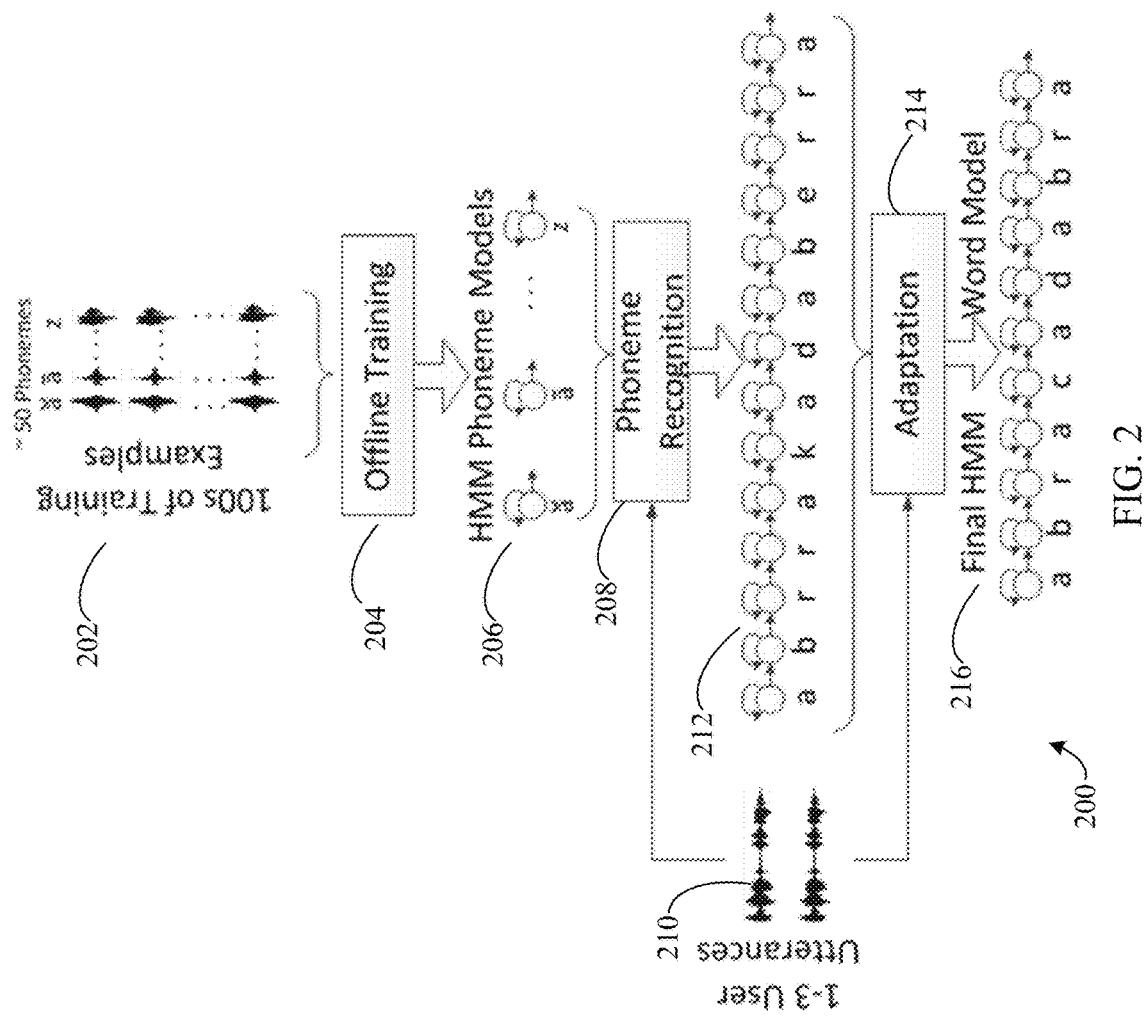

ISOLATED WORD TRAINING AND DETECTION USING GENERATED PHONEME CONCATENATION MODELS OF AUDIO INPUTS

CROSS-REFERENCE TO RELATED APPLICATIONS

This application claims priority to U.S. Provisional Patent Application No. 62/098,143, filed Dec. 30, 2014, and entitled "Isolated Word Training and Detection," which is incorporated by reference herein in its entirety.

BACKGROUND

I. Technical Field

Embodiments described herein relate to isolated word training and detection.

II. Background Art

For mobile phones and the wearables market, ultra-low power stand-by mode is critical. At the same time, these devices are increasingly becoming an always-on sensor-hub, collecting data from multiple device sensors to constantly monitor and determine location, temperature, orientation, etc. A wake-up feature, via which a device that has been placed in a very low power stand-by mode may be woken up by the utterance of a "wake-up" phrase, lends itself nicely to this environment as it too is an always-on feature and enables the user to wake up the device and enable further device capabilities via a voice interface, thus avoiding the need for cumbersome keyboard or touch interfaces. Some devices already have this wake-up phrase detection feature. For example, the Galaxy S4® by Samsung may be woken by the utterance of the phrase "Hello Galaxy". Certain Google devices may be woken by the utterance of "OK Google Now". However, each solution comes with a pre-loaded set of wake-up phrases. The users do not have the capability to use their own phrase. An investigation on discussion forums of the popularity of the wake-up feature found that most users wanted the ability to use their own phrase.

From a support stand-point, pre-loaded phrases pose other issues. Different device vendors may require their own unique wake-up phrases. Devices shipped to different countries or regions of the world will need to support wake-up phrases in various languages. The underlying speech recognition engine is typically Hidden Markov Model (HMM) based and requires hundreds of example utterances from dozens of speakers in order to properly train the model. FIG. 1 illustrates diagram of a typical training flow 100 for modeling a word or phrase. Supporting a user-selected wake-up phrase would require the user to tediously record from thirty up to one hundred example training utterances 102 of a word or phrase for typical offline HMM training 104 to generate a final HMM word model 106, and this is impractical; hence current solutions employ pre-loaded phrase support only. Since the wake-up phrases requested by different device vendors are not known ahead of time, each time there is a new device vendor to support, dozens of speakers must be recruited to do the recordings necessary to perform the offline training and obtain the HMM models. In addition, the logistics get even more complex if the phrase is in a foreign language.

BRIEF SUMMARY

Methods, systems, and apparatuses are described for isolated word training and detection, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 1 shows a diagram of a typical training flow for modeling a word or phrase.

FIG. 2 shows a diagram of a user-specific, isolated training flow for modeling a word or phrase, according to example embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 3:
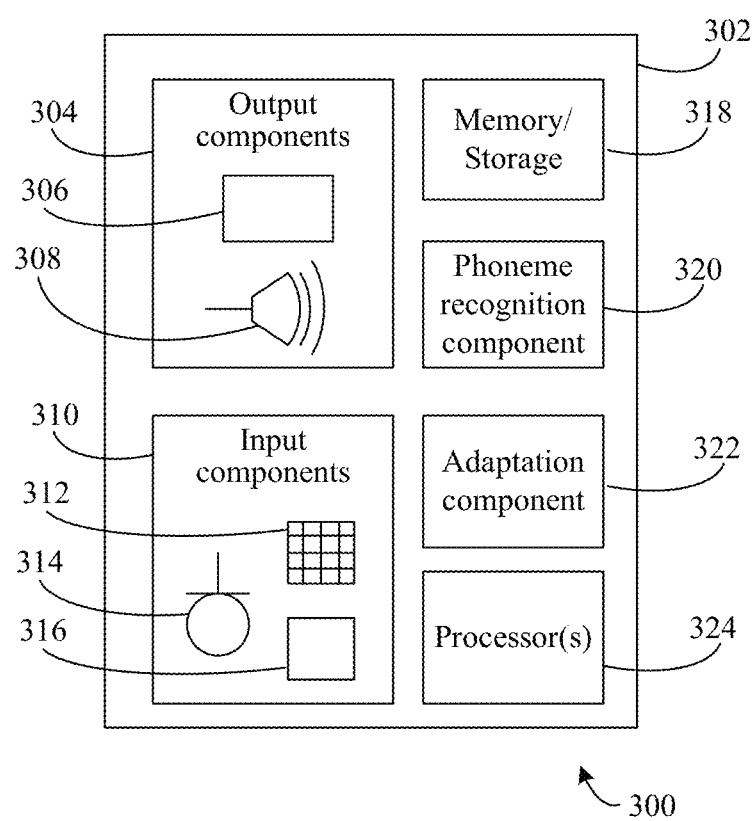
FIG. 3 shows a block diagram of an example electronic device configured for user-specific, isolated word training and detection, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, descriptive terms used herein such as "about," "approximately," and "substantially" have equivalent meanings and may be used interchangeably.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Example Embodiments

The example techniques and embodiments described herein may be adapted to various types of communication devices, communications systems, computing systems, electronic devices, and/or the like, which perform isolated word training and detection. For example, the training of user-specific word models at a device and device wake-up upon detection of a corresponding, user-provided phrase may be implemented in, and/or performed by, devices and systems according to the techniques and embodiments herein. In other words, according to the described techniques and embodiments, the isolated word training at the user device does not require complex recognition support from a cloud-based automatic speech recognition (ASR) engine or another device or system on a network and/or over the Internet (e.g., by Google Voice™ or products by Nuance®)—the user-specific word models are trained at the user device, by the user device. The isolated word training embodiments described herein may be adapted for training of isolated word models for any type of system that may require or support it, such as Bluetooth® headsets, Internet of Things (IoT) devices, Wearables, etc. Furthermore, additional structural and operational embodiments, including modifications and/or alterations, will become apparent to persons skilled in the relevant art(s) from the teachings herein.

In embodiments, a device (e.g., an electronic device and/or a communication device such as described below with respect to FIG. 3) may perform a novel training technique that enables a user to use their own unique wake-up phrase, requiring only 1-3 initial training utterances, when in a normal mode of operation during a training phase. The training technique supports any language, and the phrase does not even have to be of any language. The wake-up phrase may be one or more words, one or more portions of words, or any other utterances made and/or vocalized by a user. According to embodiments, the user of the device enters into an initial training phase, during which she repeats her desired wake-up phrase 1-3 times. From a user stand-point, this makes the feature much more desirable—that is, it is possible for a user to provide her wake-up phrase no more than three times, and perhaps only a single time. Additionally, from a support perspective, there is no need to recruit dozens of talkers to record hundreds of phrase examples every time a new mobile device vendor has a new wake-up phrase requirement. When not in use, the device may be placed into a low-power stand-by mode. When in stand-by mode, the device may be woken by providing the wake-up phrase, after which the device may be put into a normal mode of operation.

The techniques described herein enable and allow for the user to train her own keyword (i.e., a user-specified wake-up phrase or command) The initial training session only requires a relatively small number (e.g., 1 to 3) of dictated utterances or user inputs. This requirement greatly impacts the algorithm design, increases the ease of use, and provides an acceptable level of training complexity and user time commitment. As noted in the Background Section, above, a typical automatic speech recognition engine (ASR) requires on the order of thirty to one hundred utterances to train the models. Since this is not possible for each user-specific phrase for any given device, the alternative approach described herein is taken.

Referring to FIG. 2, a diagram of a user-specific training flow 200 for modeling a word or phrase, according to example embodiments, is shown. It should be noted that the number of states shown in FIG. 2 is exemplary in nature and is included for illustration of techniques and embodiments. Phoneme models may include one or more states per model, and letter sounds or letter representations may include one or more phoneme models.

As shown in FIG. 2, instead of requiring thirty to one hundred utterances to train the specific models, a phoneme based library or database containing phoneme models 206 may be trained offline at 204 and stored in one or more storage devices such as in a read-only memory (ROM). Offline training at 204 may be accomplished using hundreds of training examples 202 for phonemes of languages to be supported (e.g., approximately 45 phonemes for the English language). The phoneme library containing phoneme models 206 may be configured to contain all of the phoneme models in the languages supported. Training utterances 210 (or training sequences) are decoded at 208 using phoneme models 206 to determine the most likely phoneme decomposition of the wake-up phrase or command. As shown in the illustrated example of FIG. 2, the user utters "abracadabra." The models for the detected phonemes (which are selected from among phoneme models 206) are then used to build (at 208) an initial word-based model for the phrase using a concatenated phoneme model 212 based on phoneme transcriptions (e.g., 1 to 3 transcriptions of the uttered phrases). As shown in this example, concatenated phoneme model 212 includes phonemes representing 'a-b-r-r-a-k-a-d-a-b-e-r-r-a', and comprises a bi-phoneme model in which the next and the current phonemes may be considered during model state transitions. Mono- (transitions consider next phoneme) and tri-phoneme models (transitions consider current, next, and previous phonemes) are also contemplated herein. Concatenated phoneme models may transition between states based on a likelihood ratio (or probability) that a transition should occur.

Training utterances 210 are then used again, this time to adapt the initial word model towards the speaker at 214. This training begins to refine the speaker-independent concatenated-phoneme based model 212 into a speaker-dependent word-based model 216 representing the phonemes 'a-b-r-a-c-a-d-a-b-r-a', in this example. Pruning and state combining also occurs during adaptation 214 in order to reduce the size of speaker-dependent word-based model 216 into an efficient representation of the wake-up phrase, and hence changing the likelihood of transitions between states of the model. For example, two similar or identical states with a very high likelihood of transition between them may be combined. Subsequent recognized wake-up phrases (e.g., subsequent training utterances 210) during normal use may be used to continue to refine and/or adapt (at 214) speaker-dependent word-based model 216 and improve performance. For instance, one or more iterations of adaptation (not shown, but described below) may be required to improve from concatenated phoneme model 212 shown in FIG. 2 ('a-b-r-r-a-k-a-d-a-b-e-r-r-a') to speaker-dependent word-based model 216 ('a-b-r-a-c-a-d-a-b-r-a').

The techniques and embodiments described herein provide for such improvements in isolated word training and detection as described above.

For instance, methods, systems, and apparatuses are provided for isolated word training and detection, as well as adaptation. In an example aspect, an isolated word training system is disclosed. The system includes an input component, a recognition component, and an adaptation component. The input component is configured to receive at least one audio input representation. The recognition component is configured to generate a phoneme concatenation model of the at least one audio input representation based on a phoneme transcription. The adaptation component is configured to generate a first word model of the at least one audio input based on the phoneme concatenation model.

In another example aspect, an electronic device is disclosed. The electronic device includes a first processing component and a second processing component. The first processing component is configured to receive a user-specified wake-up phrase. The first processing component is also configured to generate a phoneme concatenation model of the user-specified wake-up phrase, and to generate a word model of the user-specified wake-up phrase based on the phoneme concatenation model. The second processing component is configured to detect audio activity of the user, and to determine if the user-specified wake-up phrase is present within the audio activity based on the word model.

In yet another example aspect, a computer-readable storage medium is provided. The computer-readable storage medium has program instructions recorded thereon that, when executed by an electronic device, perform a method for utilizing a user-specified wake-up phrase in the electronic device. The method includes training the electronic device using the user-specified wake-up phrase, received from a user, to generate, at the electronic device, a user-dependent word model of the user-specified wake-up phrase. The method also includes transitioning the electronic device from a stand-by mode to a normal operating mode subsequent to a detection, that is based on the word model, of the user-specified wake-up phrase.

It is contemplated that different embodiments described herein may be implemented together in various combinations, as would be apparent to one of skill in the art having the benefit of this disclosure. That is, embodiments described herein are not mutually exclusive of each other and may be practiced alone, or in any combination.

Various example embodiments are described in the following subsections. In particular, example device and system embodiments are described, followed by example operational embodiments. An example processor circuit implementation is also provided, and subsequently an example computer implementation is described. Next, further example embodiments and advantages are provided.

Finally, some concluding remarks are provided. It is noted that the division of the following description generally into subsections is provided for ease of illustration, and it is to be understood that any type of embodiment may be described in any subsection.

III. Example Device and System Embodiments

Systems and devices may be configured in various ways to perform isolated word training and detection. Techniques and embodiments are provided for implementing devices and systems with isolated word training and user-specific wake-up phrase detection. For instance, in embodiments, an electronic device (e.g., a communication device) may be trained using the electronic device, in isolation, for word models, such as but not limited to, word models for user-supplied wake-up phrases. Such word models may be trained at an electronic device using one to three utterances of a phrase by a user.

FIG. 3 shows an example isolated word training and detection configuration 300 for implementing the above-referenced improvements. Training and detection configuration 300 may include an electronic device 302, according to embodiments. Electronic device 302 may include output components 304, input components 310, memory/storage 318, a phoneme recognition component 320, and an adaptation component 322.

In embodiments, electronic device 302 and/or training and detection configuration 300 may also include one or more processor(s) 324 or processor circuits such as processor circuit 1000 of FIG. 10 and/or processor 1106 of FIG. 11 described below. For instance, processor(s) 324 may include an application processor (AP) in embodiments. The AP may be a processor configured to execute parts of algorithms described herein that do not need to be performed in real-time and/or that may require access to a significant amount of memory. In the context of the described embodiments, real-time means immediately upon receipt of inputs or commands, or as immediately as a device, system, or processor is capable of, or is configured to, respond. These parts of the described algorithms may be run when the devices and embodiments herein are completely awake, i.e., are in a normal operating mode. In embodiments, processor(s) 324 may also include a lower-power processor. Algorithm components that need to be run in real-time may be implemented on the lower-power processor (e.g., an ARM® Processor (CM4) or similar processing device). These parts of the described algorithms may be run when the devices and embodiments herein are not completely awake, i.e., are in a low-power or sleep operating mode.

Electronic device 302 may comprise an entertainment, communication, or computing device. For example and without limitation, electronic device 302 may comprise a smart phone, a personal digital assistant, a laptop computer, a tablet computer, a desktop computer, a security device (e.g., a voice and/or biometric sensor), an entertainment system component such as a digital video/versatile disc (DVD) player, a digital video recorder (DVR), a television, etc., a music player, an appliance, and/or the like. In embodiments, as described in further detail below, one or more portions of electronic device 302 and/or training detection configuration 300 may be implemented as a system. For instance, in alternate embodiments, certain components that are shown as being an integrated part of electronic device 302 may be part of an external device that is connected to electronic device 302. In such embodiments, configuration 300 may thus comprise an example system.

In embodiments, output components 304 may include a display component 306 and one or more loudspeakers 308. Display component 306 may be any known display interface as would understood by a person of skill in the relevant art(s) having the benefit of this disclosure. Each loudspeaker 308 may comprise an electro-mechanical transducer that operates in a well-known manner to convert electrical signals into sound waves for perception by a user. In embodiments, display component 306 may be combined with one or more of input components 304 (described below) into a single, multi-purpose input-output interface, such as a touchscreen.

In embodiments, input components 310 may include a user-manipulated component 312, one or more microphones 314, and a data interface 316. User-manipulated component 312 may be a keyboard, keypad, touchscreen, stylus pad, etc., that a user may manipulate to provide an input. Microphone(s) 314 may be any known microphone as would understood by a person of skill in the relevant art(s) having the benefit of this disclosure, and may be configured to receive environmental/ambient sounds as well as sounds generated by a user (e.g., a wake-up phrase). For example, one or more of these microphones may comprise an acoustic-to-electric transducer that operates in a well-known manner to convert sound waves into an electrical signal. Data interface 316 may be configured to allow a user to provide electronic device 302 and/or training detection configuration 300 with an electronic representation (e.g., as a file or a data stream) of a sound generated by the user or of another sound that may be used by a user as a wake-up phrase.

Memory/storage 318 may include one or more memory and/or storage components, e.g., such as those described below, e.g., with respect to FIGS. 10 and 11, according to embodiments. For instance, memory/storage 318 may include data or program storage of a processor or processing device, volatile or non-volatile memory, including types of random access memory (RAM) and/or ROM, disk storage devices, solid state storage devices, etc. Memory/storage 318 may be configured to store one or more databases, e.g., phoneme model databases and/or word models, as well as user-supplied sounds.

Phoneme recognition component 320 may comprise one or more subcomponents, described in further detail below, and may be configured to generate a phoneme concatenation model. The phoneme concatenation model may be derived from at least one audio input representation provided from a user, and may be based on a phoneme transcription(s) of the representation. Phoneme recognition component 320 may be configured to generate a phoneme concatenation model by performing one or more of: decoding feature vectors of audio input(s) using stored phoneme models to generate a phoneme transcription (that includes one or more phoneme identifiers) for each audio input (i.e., utterance of wake-up phrase) from the user, selecting a subset of phoneme identifiers from the phoneme transcription, and/or selecting corresponding phoneme models from a phoneme model database for each phoneme identifier in the subset as the phoneme concatenation model. In embodiments in which more than one phoneme transcription is used, a "best" transcription may be selected based on a likelihood score or other comparison. Once concatenated, the phoneme concatenation model may be referred to as a word model, and may be adapted as such.

Adaptation component 322 may comprise one or more subcomponents, described in further detail below, and may be configured to adapt a phoneme concatenation model or a word model. For example, an observation symbol probability distribution and/or state transition probabilities of a phoneme concatenation model may be adapted, or a phoneme concatenation model may be adapted as a whole. States may be combined or deleted by adaptation component 322 based on a transition likelihood ratio. Adaptation component 322 may also be configured to generate a word model of audio inputs based on a phoneme concatenation model, and to generate or refine further word models based on the initial word model and additional audio input(s). For instance, phonemes in a phoneme concatenation model may be combined or removed in word model generation.

In embodiments, electronic device 302 and/or training detection configuration 300 may comprise wired and/or wireless communication circuitry and/or connections (not shown) to enable voice and/or data communications between electronic device 302 and/or training detection configuration 300 and other devices, systems, and/or networks, such as, but not limited to, computer networks, telecommunication networks, other electronic devices, the Internet, and/or the like.

Figure 4:
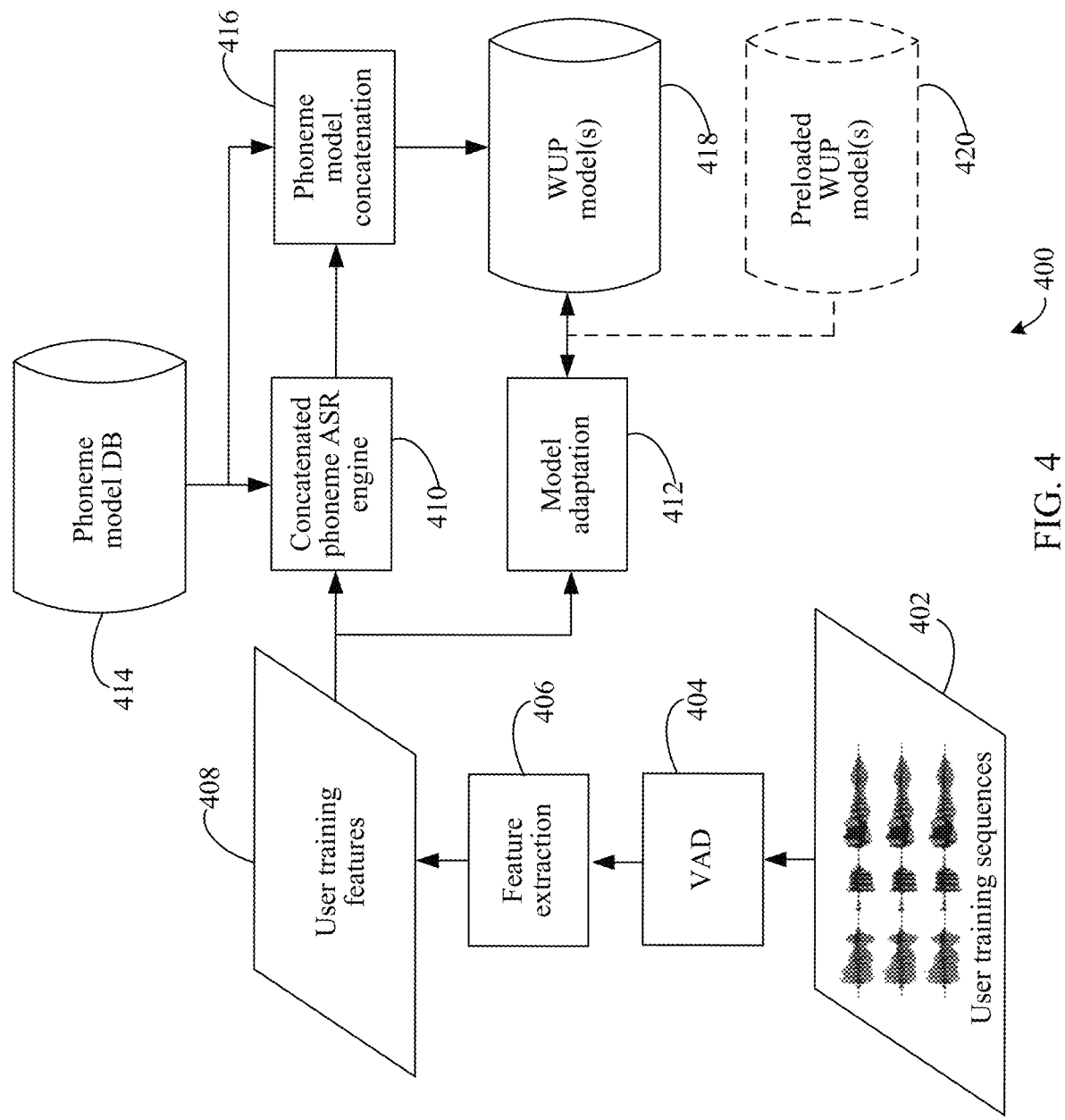
FIG. 4 shows a block diagram of a flow of a system configured for user-specific, isolated word training, according to an example embodiment.

Turning now to FIG. 4, a flow of a system configured for user-specific, isolated word training, according to an example embodiment, is shown. FIG. 4 depicts a training system 400. In embodiments, training system 400 may be included as at least a portion of electronic device 302 and/or training and detection configuration 300 of FIG. 3. That is, portions of training system 400 may be performed or implemented by various components of electronic device 302 and/or training and detection configuration 300 of FIG. 3. In embodiments, the AP and lower-power processors of processor(s) 324 shown in FIG. 3 may be included in training system 400. As shown, training system 400 includes a voice activity detector (VAD) 404, a feature extractor 406, a concatenated phoneme ASR engine 410, a model adaptation component 412, a phoneme model database (DB) 414, a phoneme model concatenation component 416, and a wake-up phrase (WUP) model DB 418. In some embodiments, training system 400 may optionally include a preloaded WUP model DB 420. It is also contemplated that in various embodiments, one or more components shown in training system 400 of FIG. 4 may not be included and that additional components may be included in embodiments.

According to embodiments, user training sequences 402 (e.g., user utterances 210 of FIG. 2) may be provided by a user by vocalization, via file transfer, from a memory or storage medium, etc. While embodiments may be described with respect to vocalization, other provisioning of user training sequences 402 is contemplated. During an initial training phase, a user may be prompted to utter their custom wake-up phrase (WUP) multiple times. The utterances are captured as user training sequences 402 at a sampling rate, e.g., of at least 8 kHz, and the audio representation thereof is provided to VAD 404. According to embodiments, the user only needs to repeat user training sequences 402 for the WUP 1 to 3 times, with the best performance corresponding to 3 utterances. VAD 404 identifies the starting and ending points of user training sequences 402 for efficient feature extraction.

User training sequences 402 (e.g., training utterances) may be provided in real-time to VAD 404, as shown in FIG. 4. Each user training sequence 402 is processed by VAD 404 to determine the time of the speech onset upon which time feature extraction component 406 may be called or activated. VAD 404 also indicates the end of user training sequences 402. Utilizing the onset time and end time of user training sequences 402, VAD 404 is able compute the total length of user training sequences 402 and ensure that a given user training sequence 402 is within a desired range of time.

User training sequences 402 that are determined to be too short or too long are rejected and an error message or re-prompting can be provided to the user for user action.

Once the speech onset is detected by VAD 404, the audio representation may be provided to feature extraction component 406 which may be configured to derive the feature vectors (i.e., user training features 408) required by the subsequent training, according to embodiments. Performing the feature extraction upfront by feature extraction component 406 allows the total storage requirements for embodiments to be significantly reduced. For example, a 39-dimension (mel-frequency cepstral coefficients, MFCC) feature vector may be computed about every 10 ms in an embodiment. Assuming an example maximum length of 2 s for the WUP, the storage requirement per user training sequence 402 is about 8 k words. Thus, if 3 user training sequences 402 are used, the total requirement is 24 kwords. It should be noted that the memory requirement can be minimized by starting the training phase immediately, or soon, after the first user training sequence 402 (i.e., the first utterance) instead of waiting until all user training sequences 402 are captured.

User training features 408 may be extracted by feature extraction component 406 and may be stored in a memory, as described herein, such as a volatile RAM. Once model adaptation (described below) is complete, this memory can be freed. The size of an example memory block may be 8 k words per user training sequence 402. User training features 408 may be used by concatenated phoneme ASR engine 410 and model adaptation component 412, as shown in FIG. 4, both of which may be implemented on the AP, as described with respect to processor(s) 324 of FIG. 3. Thus, according to embodiments, the memory block storing user training features 408 needs to be accessed only by the AP.

Concatenated phoneme ASR engine 410 is configured to decode the extracted user training features 408 using a phoneme database or library, such as phoneme model DB 414 described below. Concatenated phoneme ASR engine 410 is configured to produce a phoneme transcription of the WUP for each utterance by the user. In embodiments in which more than one phoneme transcription is used, a "best" transcription may be selected based on a likelihood score or other comparison. Concatenated phoneme ASR engine 410 may be implemented on the AP in embodiments, and can run in non-real-time as user training features 408 may already be stored in memory (e.g., in a RAM).

Phoneme model database (DB) 414 may be configured to store one or more phoneme models, e.g., phoneme models 206 shown in FIG. 2. Phoneme model DB 414 may be implemented in a memory or storage medium such as these described herein. There are approximately 45 phonemes in the English language. Most known languages could be supported according to the embodiments herein using an English-originated version of phoneme model DB 414. Alternatively, phoneme model DB 414 may cover the major unique phonemes of the most common known languages, or models of any other language phonemes could be used. A Hidden Markov Model (HMM) may be trained offline for each phoneme to generate a phoneme model such as phoneme models 206 of FIG. 2. These models may be static and may be stored in a storage medium or memory, e.g., a ROM, as shown in FIG. 3 or described elsewhere herein. Additionally, because the WUP training does not have to be performed in real-time and can be a background task, the memory access speed may be slower allowing for more flexible implementations. In embodiments, for 3 states and 2 mixtures per model with an 80 dimension model, each phoneme model requires 480 words (2-byte) for a DB library total of about 21 kwords. Adding other required memory (e.g., transition matrices) may bring the total to about 23 kwords.

Based on the results produced by concatenated phoneme ASR engine 410 described above, phoneme model concatenation component 416 is configured to determine the best phonemes models to extract from phoneme model DB 414 and to concatenate the determined phoneme models to produce an initial WUP model. Phoneme model concatenation component 416 may run on the AP in embodiments.

The initial WUP model may consist of the concatenated phoneme models extracted from the phoneme model DB 414. Human speech production is capable of about 10 phonemes per second, yielding a maximum of 20 phonemes for an example 2 s (maximum) long WUP command. The initial WUP model may later be adapted by model adaptation component 412.

The initial WUP model may be adapted by model adaptation component 412 based on user training sequences 402. The WUP model thus begins a transition from a speaker-independent concatenated phoneme model to a speaker-dependent isolated word model. This stage of adaptation may reduce the number of total states in the WUP model. Model adaptation component 412 may use user training features 408 and the initial WUP model (both of which may be stored in RAM). Optionally, model adaptation component 412 may use a preloaded WUP model from preloaded WUP model(s) DB 420. Model adaptation component 412 may run in real-time or non-real-time, and may run on the AP in embodiments. The output of model adaptation component 412 is the WUP model (e.g., word-based model 216 of FIG. 2).

The WUP model is the HMM model adapted by the model adaptation component 412 and used for detection by a WUP detector (described in further detail below). The WUP model is accessible for reading and writing by the model adaptation component 412 running on the AP, in embodiments, and for reading by a WUP detector running on the lower-power processor (or other device). Because the WUP detector must run in real-time to detect a wake-up phrase from a user, fast access is required when accessed by the lower-power processor. As explained previously, the size of the WUP model is approximately 20 kwords.

WUP model DB 418 may be configured to store one or more WUP models. WUP model DB 418 may be implemented in a memory or storage medium such as those described herein.

Optionally, in embodiments, pre-trained speaker-independent WUPs may be provided in preloaded WUP model(s) DB 420. The models for these preloaded WUPs may be stored in ROM as described elsewhere herein. In embodiments, each preloaded WUP model in preloaded WUP model(s) DB 420 would require approximately 20 kwords.

While FIG. 4 is shown in the context of system-level flow diagram, the described embodiments may be applied to a variety of products that employ isolated word training, detection, and/or adaptation. Embodiments may be applied to electronic or communication devices like portable products, such as smart phones, tablets, laptops, gaming systems, etc., to stationary products, such as desktop computers, office phones, conference phones, gaming systems, appliances, etc., and to car entertainment/navigation systems, as well as being applied to further types of mobile and stationary devices such as security systems, devices, and/or circuits.

Figure 5:
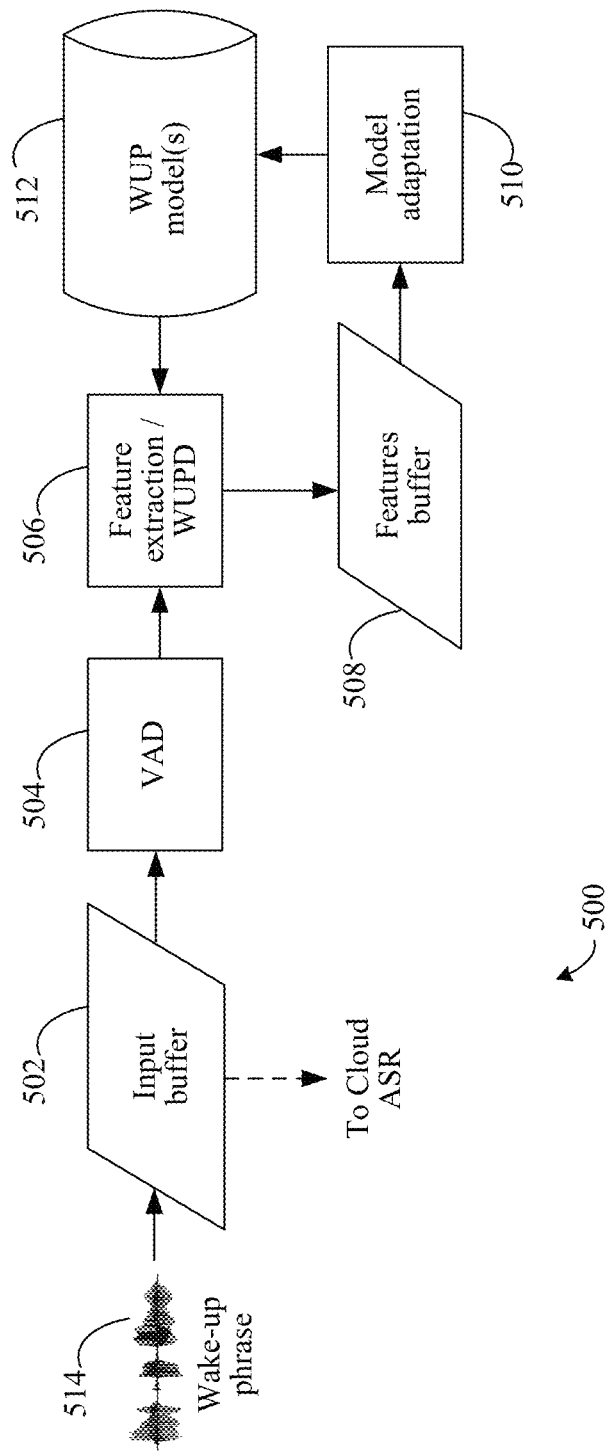
FIG. 5 shows a block diagram of a system configured for user-specific wake up phrase detection, according to an example embodiment.

Turning now to FIG. 5, a flow of a system configured for user-specific wake up phrase detection and adaptation, according to an example embodiment, is shown. FIG. 5 depicts a detection and adaptation system 500. In embodiments, detection and adaptation system 500 may be included as at least a portion of electronic device 302 and/or training detection configuration 300 of FIG. 3. That is, portions of detection and adaptation system 500 may be performed or implemented by various components of electronic device 302 and/or training detection configuration 300 of FIG. 3. In embodiments, the AP and lower-power processors of processor(s) 324 shown in FIG. 3 may be included in detection and adaptation system 500. As shown, detection and adaptation system 500 includes an input buffer 502, a voice activity detector (VAD) 504, a feature extractor and wake-up phrase detector (WUPD) component 506, a features buffer 508, a model adaptation component 510, and a WUP model DB 512. It is contemplated that in various embodiments, one or more components shown in detection and adaptation system 500 of FIG. 5 may not be included and that additional components may be included in embodiments.

Input buffer 502 may be implemented as a memory or storage medium, as described herein, such as RAM. Input buffer 502 is configured to ensure that the wake-up phrase is not clipped due to a delayed speech onset decision by VAD 504. The size of input buffer may be set to 0.5 s, or 0.5 s*8000 samples/s=4 k words, in embodiments. As shown, input buffer 502 receives a wake-up phrase (WUP) 514 as an input. WUP 514 may be provided by a user by vocalization, via file transfer, from a memory or storage medium, etc.

Input buffer 502 is also configured to hold or store WUP 514 in order to route the audio representation to the cloud for continuous speech recognition by continuous ASR applications once the wake-up phrase is detected.

VAD 504 may be a further embodiment of VAD 404 described with respect to FIG. 4. VAD 504 may be configured as a frame-based voice activity detector to be used as a speech onset detector (SOD) to detect the initial presence of speech. If a speech onset is detected, VAD 504 is configured to trigger the lower-power processor (e.g., as described above with respect to FIGS. 3 and 4) to initiate a WUPD. VAD 504 may also be configured to be implemented on the AP as described above with respect to FIG. 4. This is beneficial in embodiments to ensure that the WUP model is trained using the same audio processing components as compared to the WUPD. In some embodiments, VAD 504 may be configured as stand-alone electrical circuitry, and in further embodiments, such electrical circuitry may be configured to have a very low power consumption (e.g., during a stand-by or sleep mode of an electronic device).

VAD 504 is also configured to indicate the end of WUP 514, which can be used in combination with a speech onset flag to determine the approximate length of WUP 514 and ensure that the length is appropriate (not too short or too long). In embodiments, only phrases that fall within the target length are accepted and used for training and wake-up.

In embodiments, feature extractor and WUPD component 506 may comprise a feature extractor portion and a WUPD portion. The WUPD portion is used to detect or reject the presence of the WUP in the captured audio. The WUPD portion is configured to run on the lower-power processor described herein. Its execution may be triggered by a positive speech onset detection by VAD 504. After detection by VAD 504, the audio representation is passed to the WUPD portion and is also stored in input buffer 502. The WUPD portion is configured to read the input audio representation in frames (e.g., of 10 ms assuming an input sampling rate of 8 kHz), and is also configured to use the WUP model (e.g., as stored in a non-volatile RAM). The acceptance or rejection of the wake-up phrase detection may be based on a likelihood or ratio of classical Viterbi decoding of HMM for isolated word recognition (i.e., as the numerator of the ratio) and a garbage model Gaussian Mixture Model (GMM) to handle non-keyword input references (i.e., as the denominator of the ratio). In other words, posteriori probabilities may be determined for a given phrase based on a likelihood of the given phrase as compared to other possible phrases in the presence of unconstrained training sounds.

If the WUPD portion rejects the presence of the WUP, monitoring continues by VAD 504 for the presence of another speech onset. If the WUPD portion detects the presence of the WUP, an onset flag is set. Optionally, in embodiments, the contents of input buffer 502 and the subsequent audio may be provided to a continuous ASR engine in the cloud or elsewhere. In embodiments, the WUPD may also initiate model adaptation given a high confidence in the identification of the WUP by the WUPD portion and the input noise conditions.

During processing by the WUPD portion, the feature extraction portion of feature extractor and WUPD component 506 may be executed. The feature extraction portion may be configured similarly as feature extraction component 406 of FIG. 4 such that features of the WUP are extracted, according to embodiments. The extracted features may be used by the WUPD portion and may also be stored in features buffer 508 for future use by model adaptation component 510. If the WUPD portion declares a WUP, the stored features may be used by model adaptation component 510. If the WUPD portion rejects the presence of the WUP, the contents of features buffer 508 can be cleared.

Features buffer 508 may be implemented as a memory or storage medium as described herein (e.g., a RAM or a volatile RAM). Features buffer 508 is configured to store the features extracted by the feature extraction portion of feature extractor and WUPD component 506 until such time that it is determined that the WUP was uttered and adaptation should take place by model adaptation component 510. The size of features buffer 508 may be dependent upon the anticipated maximum length of the WUP. For example, assuming a 2 s maximum WUP, the size of the buffer is (2 s)*(100 frames/s)*(39 words/frame)=8 kwords. In embodiments, the size may be more or less than the described exemplary embodiment. Features buffer 508 may be configured to be read from by the AP. Features buffer 508 can be freed for other use after completion of the functions of model adaptation component 510.

After the features are extracted and stored in features buffer 508, model adaptation component 510 may be invoked. Model adaptation component 510 may be similarly or identically configured as model adaptation component 412 of FIG. 4, or may be a further embodiment of model adaptation component 412 that is configured to use only a single WUP instead of iterating using multiple WUPs. Model adaptation component 510 is configured to read a stored WUP model from a memory or storage, such as a non-volatile RAM, and to write an updated WUP model back upon completion. Model adaptation component 510 is configured to be executed on the AP and does not have to execute in real-time because the features used for the adaptation are stored in a memory, e.g., features buffer 508. However, it is contemplated that model adaptation component 510 may be executed in real-time or substantially in real-time according to some embodiments.

WUP model DB 512 may be configured to store one or more WUP models and may be a further or similar embodiment of WUP model DB 418 of FIG. 4 described above. For example, WUP model DB 512 may store a WUP model trained according to embodiments described with respect to training system 400 of FIG. 4. WUP model DB 512 may be implemented in a memory or storage medium such as these described herein.

IV. Example Operational Embodiments

Embodiments and techniques, including methods, described herein may be performed in various ways such as, but not limited to, being implemented by hardware, software, firmware, and/or any combination thereof. Training and detection configuration 300, electronic device 302, training system 400, and/or detection and adaptation system 500, along with any subcomponents thereof, as well as processor and computer embodiments described below, may each operate according to one or more of the flowcharts described in this section. Other structural and operational embodiments will be apparent to persons skilled in the relevant art(s) based on the discussion regarding the described flowcharts.

Figure 6:
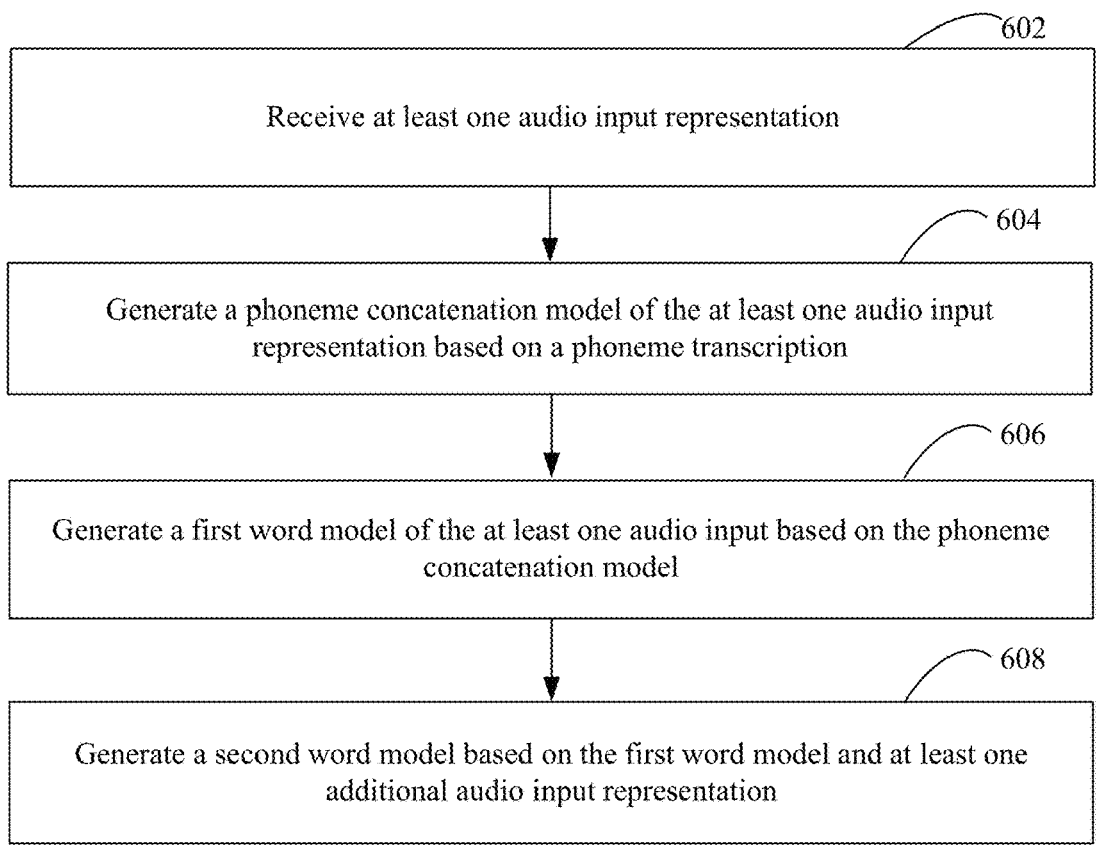
FIG. 6 shows a flowchart according to which example embodiments herein are configured to perform isolated word model training, detection, and/or adaptation, according to an example embodiment.

For example, FIG. 6 shows a flowchart 600 according to which example embodiments herein are configured to perform. For instance, training and detection configuration 300, electronic device 302, training system 400, and/or detection and adaptation system 500, along with any subcomponents thereof, may be configured to perform isolated word model training, detection, and/or adaptation, according to flowchart 600. Flowchart 600 is described as follows.

In flowchart 600, at least one audio input representation is received (602). In embodiments, an input component may be configured to receive the at least one audio input representation. The input component may be one or more input components 310 of FIG. 3 or other input components described herein. The audio input representation may be speech or vocalized sounds from a user, may be received from a file, may be received from a memory or storage media, and/or the like.

A phoneme concatenation model of the at least one audio input representation is generated based on a phoneme transcription (604). For example, a phoneme recognition component or portion thereof may be configured to generate the phoneme concatenation model. The phoneme recognition component may be phoneme recognition component 320 of FIG. 3, or any component thereof, or phoneme model concatenation component 416 of FIG. 4, according to embodiments.

A first word model of the at least one audio input is generated based on the phoneme concatenation model (606). For example, an adaptation component may be configured to generate the first word model. The adaptation component may be adaptation component 322 of FIG. 3 or model adaptation component 412 of FIG. 4, according to embodiments.

A second word model is generated based on the first word model and at least one additional audio input representation (608). For instance, the adaptation component of 606 may be further configured to generate the second word model. According to an embodiment, the adaptation component may be model adaptation component 510 of FIG. 5. In this manner, the first word model is further adapted, i.e., improved, and more specifically tailored to the user's WUP.

In some example embodiments, one or more of 602, 604, 606, and/or 608 of flowchart 600 may not be performed. Moreover, capabilities in addition to or in lieu of 602, 604, 606, and/or 608 may be performed. Further, in some example embodiments, one or more of the capabilities in 602, 604, 606, and/or 608 may be performed out of order, in an alternate sequence, or partially (or completely) concurrently with each other or with other capabilities.

Figure 7:
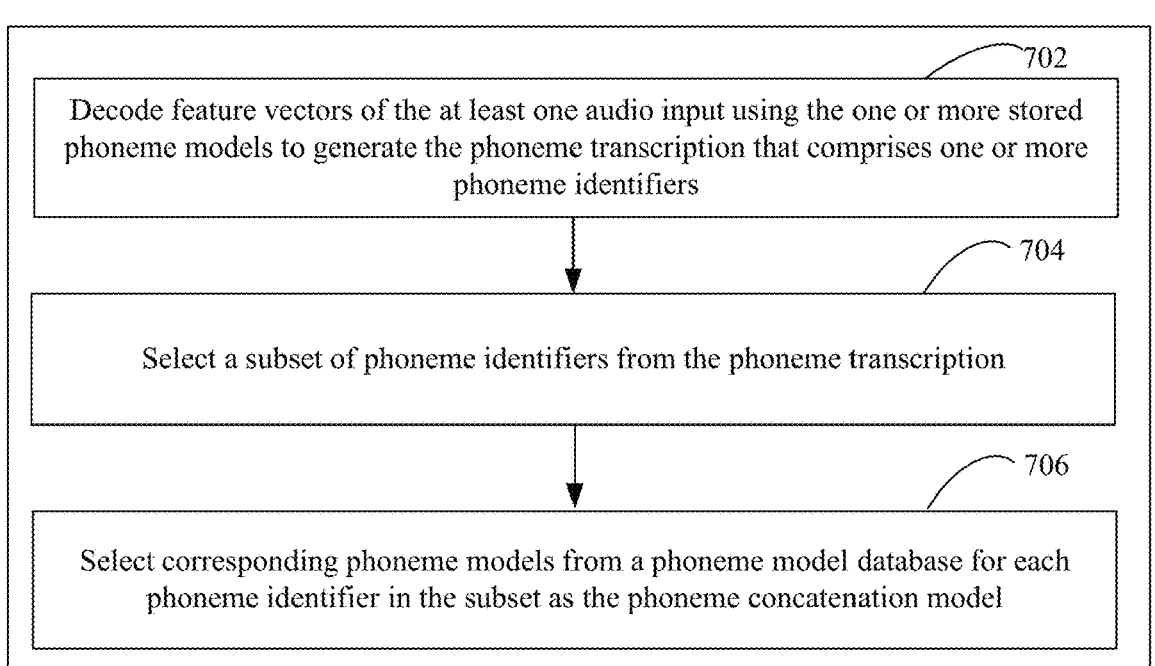
FIG. 7 shows a flowchart according to which example embodiments herein are configured to perform isolated word model training, detection, and/or adaptation, according to an example embodiment.

FIG. 7 shows a flowchart 700 according to which example embodiments herein are configured to perform. For instance, training and detection configuration 300, electronic device 302, training system 400, and/or detection and adaptation system 500, along with any subcomponents thereof, may be configured to perform isolated word model training, detection, and/or adaptation, according to flowchart 700. Flowchart 700 may represent a further embodiment of 604 of flowchart 600 in FIG. 6. Flowchart 700 is described as follows.

In flowchart 700, feature vectors of the at least one audio input are decoded using the one or more stored phoneme models to generate the phoneme transcription that comprises one or more phoneme identifiers (702). In embodiments, the feature vectors may be decoded by phoneme recognition component 320 of FIG. 3, or any component thereof, or concatenated phoneme ASR engine 410 of FIG. 4. Each phoneme transcription identifier may be based on decoded feature vectors corresponding to phoneme models stored in a DB such as phoneme model DB 414 of FIG. 4.

A subset of phoneme identifiers are selected from the phoneme transcription (704). The selection may be performed by phoneme recognition component 320 of FIG. 3, or any component thereof, or phoneme model concatenation component 416 of FIG. 4. In embodiments, the subset may be the entirety of phonemes making up the phoneme transcription, or may be less than the entirety.

Corresponding phoneme models are selected from a phoneme model database for each phoneme identifier in the subset as the phoneme concatenation model (706). The selection may be performed by phoneme recognition component 320 of FIG. 3, or any component thereof, or phoneme model concatenation component 416 of FIG. 4. For example, each identifier in the subset may correspond to a phoneme model in phoneme model DB 414. The corresponding phoneme model may be selected from the DB to be part of the phoneme concatenation model.

In some example embodiments, one or more of 702, 704, and/or 706 of flowchart 700 may not be performed. Moreover, capabilities in addition to or in lieu of 702, 704, and/or 706 may be performed. Further, in some example embodiments, one or more of the capabilities in 702, 704, and/or 706 may be performed out of order, in an alternate sequence, or partially (or completely) concurrently with each other or with other capabilities.

Figure 8:
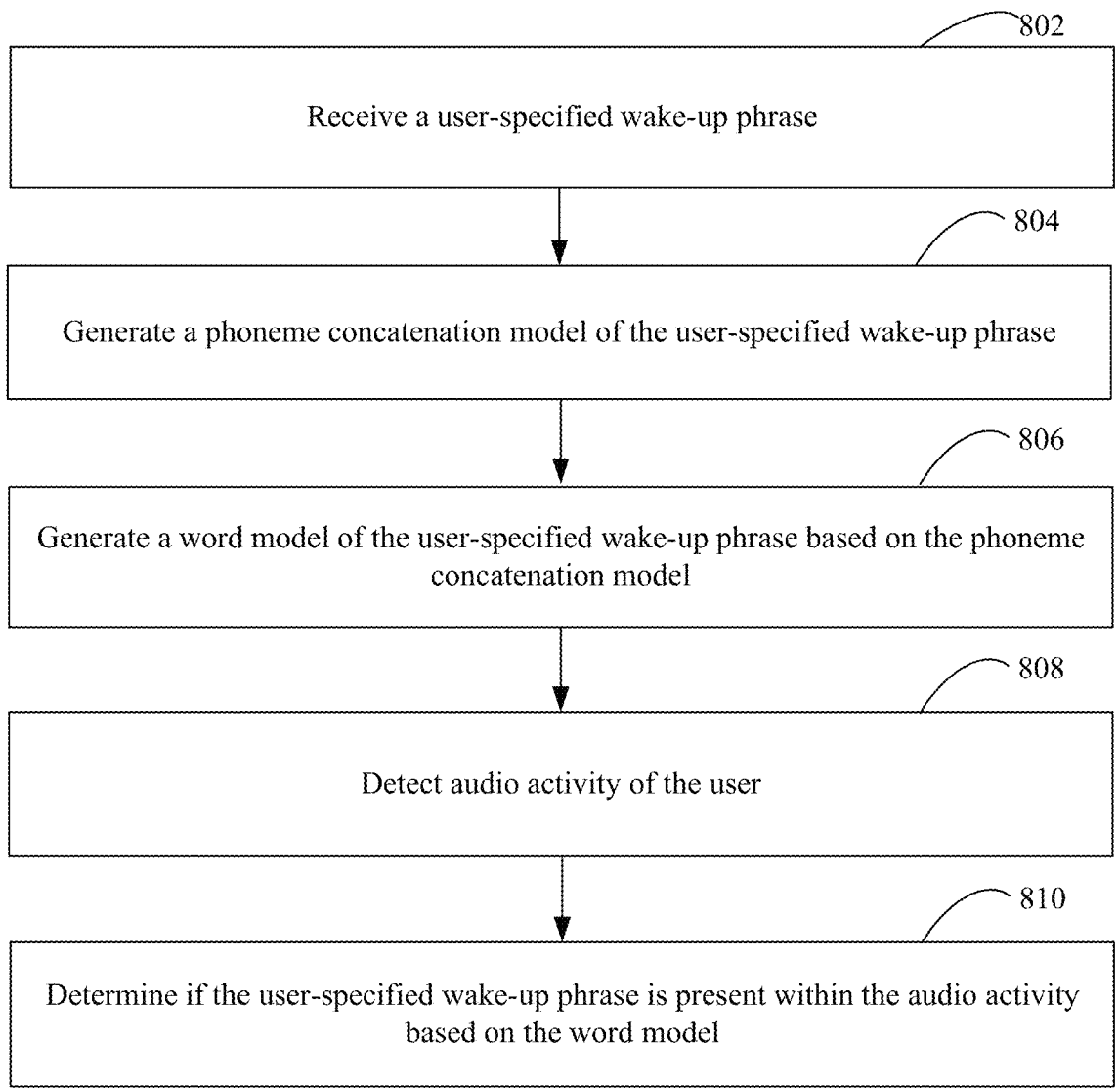
FIG. 8 shows a flowchart according to which example embodiments herein are configured to perform isolated word model training, detection, and/or adaptation, according to an example embodiment.

FIG. 8 shows a flowchart 800 according to which example embodiments herein are configured to perform. For instance, training and detection configuration 300, electronic device 302, training system 400, and/or detection and adaptation system 500, along with any subcomponents thereof, may be configured to perform isolated word model training, detection, and/or adaptation, according to flowchart 800. Flowchart 800 is described as follows.

In flowchart 800, a user-specified wake-up phrase is received (802). In embodiments, an input component may be configured to receive the user-specified wake-up phrase. The input component may be one or more input components 310 of FIG. 3 or other input components described herein. The user-specified wake-up phrase may be speech or vocalized sounds from a user, may be received from a file, may be received from a memory or storage medium, and/or the like, as described herein.

A phoneme concatenation model of the user-specified wake-up phrase is generated (804). For example, a phoneme recognition component or portion thereof may be configured to generate the phoneme concatenation model. The phoneme recognition component may be phoneme recognition component 320 of FIG. 3 or phoneme model concatenation component 416 of FIG. 4, according to embodiments. The phoneme recognition component may generate the phoneme concatenation model based at least in part on an output of a concatenated phoneme ASR engine (e.g., 410 of FIG. 4) and/or on a phoneme model stored in a phoneme model DB (e.g., 414 of FIG. 4).

A word model of the user-specified wake-up phrase is generated based on the phoneme concatenation model (806). For example, an adaptation component may be configured to generate the word model of the user-specified wake-up phrase. The adaptation component may be adaptation component 322 of FIG. 3 or model adaptation component 412 of FIG. 4, according to embodiments.

Continuing with flowchart 800, audio activity of the user is detected (808). For instance, a voice activity detector (VAD) may be used to detect the audio activity of the user. According to an embodiment, VAD 404 of FIG. 4 or VAD 504 of FIG. 5 may perform the detection. In an example embodiment, VAD 504 may be configured as a frame-based voice activity detector to be used as a speech onset detector (SOD) to detect the initial presence of speech or a representation thereof. If a speech onset is detected, VAD 504 is configured to trigger a lower-power processor (e.g., as described above with respect to FIGS. 3 and 4) to initiate a wake-up phrase detection (WUPD).

Then, it is determined if the user-specified wake-up phrase is present within the audio activity based on the word model (810). A feature extractor and WUPD component may be configured to make such a determination. For instance, feature extractor and WUPD component 506 may comprise a feature extractor portion and a WUPD portion as described herein. The WUPD portion is configured to detect or reject the presence of the WUP in the captured audio. Its execution may be triggered by a positive speech onset detection by a VAD (e.g., VAD 504). After detection by a VAD, an audio representation of the activity is passed to the WUPD portion. The WUPD portion is configured to sample frames of the audio representation with audio features extracted by the feature extraction portion and compare the samples to stored wake-up phrase models to determine if the wake-up phrase is present.

In embodiments, the presence of the wake-up phrase (i.e., a positive detection) may trigger a device to wake up, or come out of a stand-by mode or a sleep mode (i.e., a low power mode), into a normal mode of operation.

In some example embodiments, one or more of 802, 804, 806, 808, and/or 810 of flowchart 800 may not be performed. Moreover, capabilities in addition to or in lieu of 802, 804, 806, 808, and/or 810 may be performed. Further, in some example embodiments, one or more of the capabilities in 802, 804, 806, 808, and/or 810 may be performed out of order, in an alternate sequence, or partially (or completely) concurrently with each other or with other capabilities.

Figure 9:
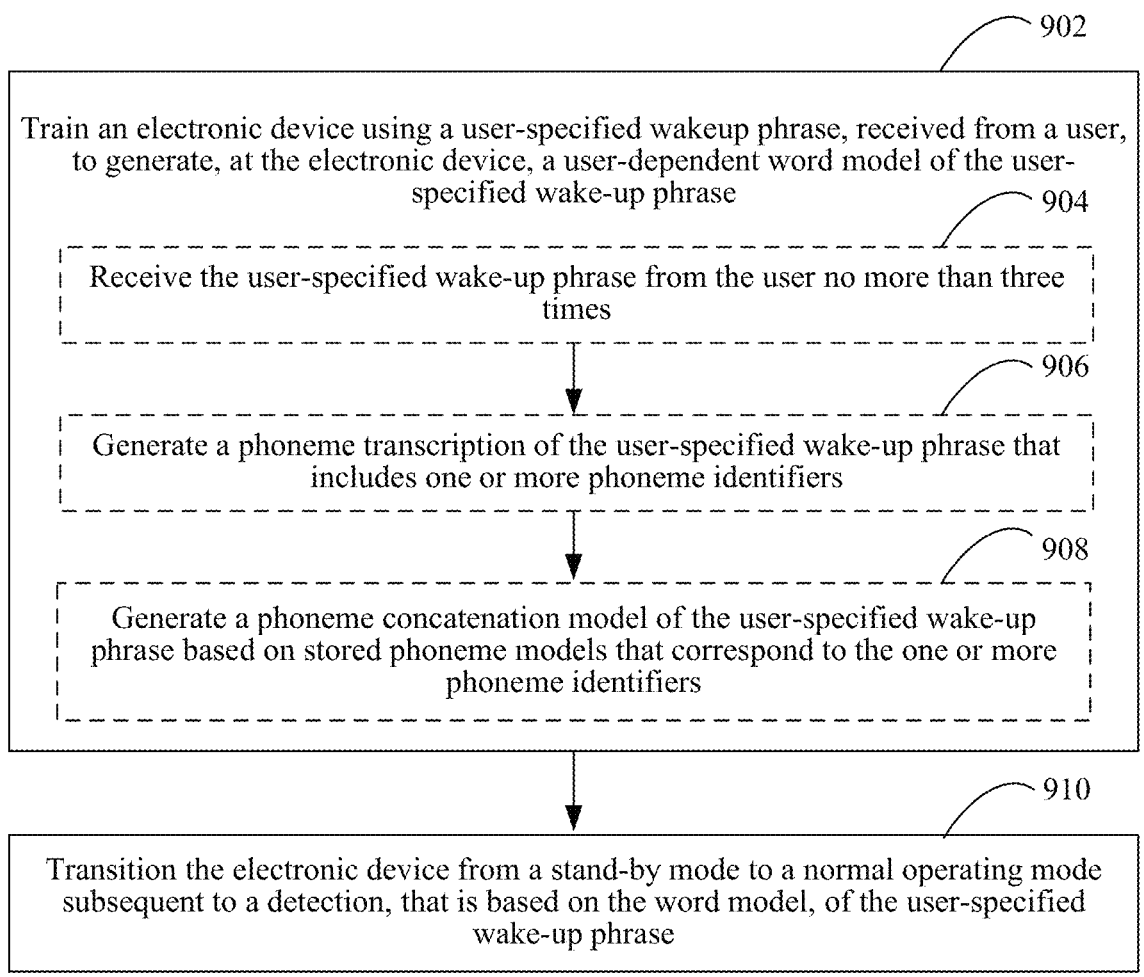
FIG. 9 shows a flowchart according to which example embodiments herein are configured to perform isolated word model training, detection, and/or adaptation, according to an example embodiment.

FIG. 9 shows a flowchart 900 according to which example embodiments herein are configured to perform. For instance, training and detection configuration 300, electronic device 302, training system 400, and/or detection and adaptation system 500, along with any subcomponents thereof, may be configured to perform isolated word model training, detection, and/or adaptation, according to flowchart 900. Flowchart 900 is described as follows.

In flowchart 900, an electronic device is trained using a user-specified wakeup phrase, received from a user, to generate, at the electronic device, a user-dependent word model of the user-specified wake-up phrase (902). In embodiments, this training may comprise one or more portions of flowchart 600 of FIG. 6 and/or flowchart 700 of FIG. 7, as described above. The electronic device may be trained in isolation, according to embodiments, while still providing the capability of user-specified wakeup phrase training to the user.

The training (e.g., 902) may optionally comprise the performance of additional capabilities which one more embodiments described herein are configured to perform (e.g., 904, 906, and/or 908).

For example, the user-specified wake-up phrase may be received from the user no more than three times (904). For example, during the training phase, according to embodiments, a user may provide the user-specified wake-up phrase to the electronic device a single time while one or two additional receptions may provide for improved, user-specific training. As previously noted, the ability of a user to provide very few utterances of a training phrase may be very desirable for usability of the features and techniques described herein.

Furthermore, a phoneme transcription of the user-specified wake-up phrase may be generated that includes one or more phoneme identifiers (906). For example, feature vectors of the wake-up phrase are decoded using the one or more stored phoneme models to generate the phoneme transcription that comprises one or more phoneme identifiers. In embodiments, the feature vectors may be decoded by phoneme recognition component 320 of FIG. 3, or any component thereof, or concatenated phoneme ASR engine 410 of FIG. 4. Each phoneme transcription identifier may be based on decoded feature vectors corresponding to phoneme models stored in a database such as phoneme model DB 414 of FIG. 4.

Still further, a phoneme concatenation model of the user-specified wake-up phrase may be generated based on stored phoneme models that correspond to the one or more phoneme identifiers (908). For instance, phoneme models corresponding to the phoneme identifiers may be selected from a phoneme model database for each phoneme identifier. The selection may be performed by phoneme recognition component 320 of FIG. 3, or any component thereof, or phoneme model concatenation component 416 of FIG. 4. For example, each phoneme identifier may correspond to a phoneme model in phoneme model DB 414. The corresponding phoneme model may be selected from the DB to be part of the phoneme concatenation model. The selected phoneme models are concatenated to generate the phoneme concatenation model.

Continuing with flowchart 900, the electronic device is transitioned from a stand-by mode to a normal operating mode subsequent to a detection, that is based on the word model, of the user-specified wake-up phrase (910). In embodiments, this transitioning may comprise one or more portions of flowchart 800 of FIG. 8, as described above. For example, a VAD as described herein may detect an onset of speech or user audio signals which may trigger audio feature extraction and wake-up phrase detection using a stored wake-up phrase model. Upon detection, the presence of the wake-up phrase (i.e., a positive detection) may trigger a device to wake up, or come out of a stand-by mode or a sleep mode (i.e., a low power mode), into a normal mode of operation.

In some example embodiments, one or more of 902, 904, 906, 908, and/or 910 of flowchart 900 may not be performed. Moreover, capabilities in addition to or in lieu of 902, 904, 906, 908, and/or 910 may be performed. Further, in some example embodiments, one or more of the capabilities in 902, 904, 906, 908, and/or 910 may be performed out of order, in an alternate sequence, or partially (or completely) concurrently with each other or with other capabilities.

V. Example Processor and Computer Implementations

Figure 10:
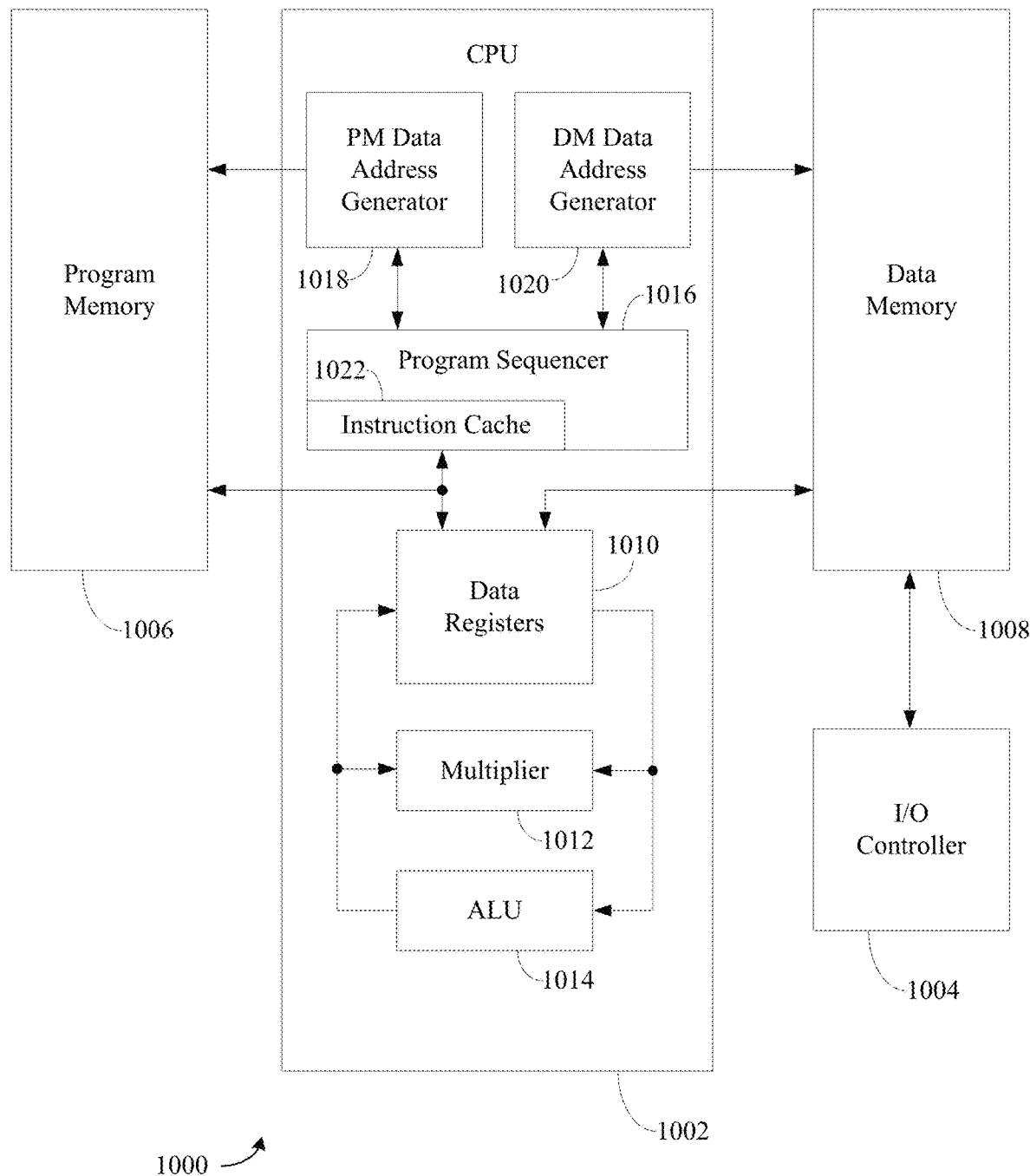
FIG. 10 depicts a block diagram of a processor circuit that may be configured to perform techniques disclosed herein.

FIG. 10 depicts a block diagram of a processor circuit 1000 in which portions of training and detection configuration 300, electronic device 302, training system 400, detection and adaptation system 500, and/or any flowchart described herein, along with any subcomponents thereof, as well as any methods, algorithms, and functions described herein, may be implemented. Processor circuit 1000 is a physical hardware processing circuit and may include central processing unit (CPU) 1002, an I/O controller 1004, a program memory 1006, and a data memory 1008. CPU 1002 may be configured to perform the main computation and data processing function of processor circuit 1000. I/O controller 1004 may be configured to control communication to external devices via one or more serial ports and/or one or more link ports. For example, I/O controller 1004 may be configured to provide data read from data memory 1008 to one or more external devices and/or store data received from external device(s) into data memory 1008. Program memory 1006 may be configured to store program instructions used to process data. Data memory 1008 may be configured to store the data to be processed.

Processor circuit 1000 further includes one or more data registers 1010, a multiplier 1012, and/or an arithmetic logic unit (ALU) 1014. Data register(s) 1010 may be configured to store data for intermediate calculations, prepare data to be processed by CPU 1002, serve as a buffer for data transfer, hold flags for program control, etc. Multiplier 1012 may be configured to receive data stored in data register(s) 1010, multiply the data, and store the result into data register(s) 1010 and/or data memory 1008. ALU 1014 may be configured to perform addition, subtraction, absolute value operations, logical operations (AND, OR, XOR, NOT, etc.), shifting operations, conversion between fixed and floating point formats, and/or the like.

CPU 1002 further includes a program sequencer 1016, a program memory (PM) data address generator 1018, a data memory (DM) data address generator 1020. Program sequencer 1016 may be configured to manage program structure and program flow by generating an address of an instruction to be fetched from program memory 1006. Program sequencer 1016 may also be configured to fetch instruction(s) from instruction cache 1022, which may store an N number of recently-executed instructions, where N is a positive integer. PM data address generator 1018 may be configured to supply one or more addresses to program memory 1006, which specify where the data is to be read from or written to in program memory 1006. DM data address generator 1020 may be configured to supply address(es) to data memory 1008, which specify where the data is to be read from or written to in data memory 1008.

Training and detection configuration 300, electronic device 302, training system 400, detection and adaptation system 500, and/or any flowchart described herein, along with any subcomponents thereof, and/or any further systems, sub-systems, components, and/or flowcharts disclosed herein may be implemented in hardware (e.g., hardware logic/electrical circuitry), or any combination of hardware with software (computer program code or instructions configured to be executed in one or more processors or processing devices) and/or firmware. Such embodiments may be commensurate with the description in this Section.

Figure 11:
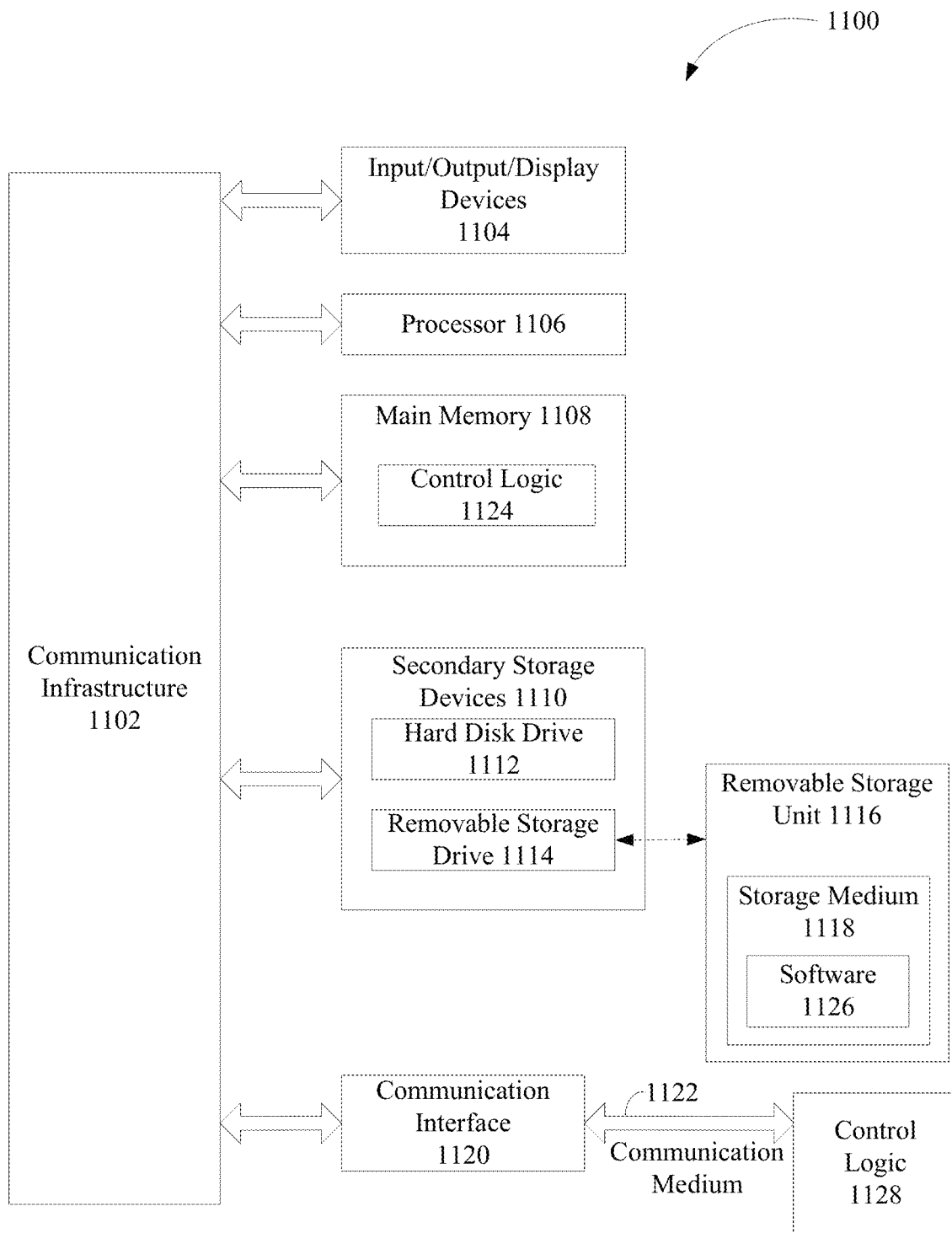
FIG. 11 shows a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 1100 shown in FIG. 11. It should be noted that computer 1100 may represent communication devices (e.g., phone terminals), processing devices, and/or traditional computers in one or more embodiments. For example, phone terminal 202, and any of the sub-systems, components, and/or models respectively contained therein and/or associated therewith, may be implemented using one or more computers 1100.

Computer 1100 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1100 may be any type of computer, including a desktop computer, a server, etc.

Computer 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads, and in some embodiments, processor 1106 may comprise one or more processors.

Computer 1100 also includes a primary or main memory 1108, such as random access memory (RAM). Main memory 1108 has stored therein control logic 1124 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well-known manner.

Computer 1100 also includes input/output/display devices 1104, such as touchscreens, LED and LCD displays, monitors, keyboards, pointing devices, etc.

Computer 1100 further includes a communication or network interface 1118. Communication interface 1120 enables computer 1100 to communicate with remote devices. For example, communication interface 1120 allows computer 1100 to communicate over communication networks or mediums 1122 (representing a form of a computer useable or readable medium), such as LANs, WANs, the Internet, etc. Network interface 1120 may interface with remote sites or networks via wired or wireless connections.

Control logic 1128 may be transmitted to and from computer 1100 via the communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, stationary devices such as conference phones, office phones, gaming consoles, and desktop computers, as well as car entertainment/navigation systems. A device, as defined herein, is a machine or manufacture as defined by 35 U.S.C. § 101. Devices may include digital circuits, analog circuits, or a combination thereof. Devices may include one or more processor circuits (e.g., processor circuit 1000 of FIG. 10, central processing units (CPUs) (e.g., processor 1106 of FIG. 11), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Further Example Embodiments and Advantages

Performance of the described embodiments for isolated word training, e.g., of user-specified wake-up phrases, provides for an extremely high rejection rate of false positives while providing a high detection rate for actual user utterances. The embodiments support multiple wake-up phrases for single users, as well as one or more wake-up phrases for multiple users. WUPD may be performed on low-power devices, and considerations are described herein for real-time and non-real-time processing complexity and memory utilization.

Embodiments and techniques also contemplate leading pauses for detection of wake-up phrases, and trailing speech that specifies commands and/or queries to follow a wake-up phrase.

Embodiments and techniques enable the use of HMMs and achieve 99+% accuracy while avoiding the requirement of a vast amount of training data for a wake-up phrase, instead transferring that requirement to a phoneme database that can be trained offline and stored by a device.

Embodiments and techniques described herein may be performed in various ways such as, but not limited to, being implemented by hardware, software, firmware, and/or any combination thereof. For example, embodiments may be implemented as specifically customized hardware or electrical circuitry that operates in a low-power mode.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. An isolated word training system that comprises:
a hardware processor;
a hardware input device configured to receive at least one audio input representation;
a recognition component executing on the hardware processor, the recognition component configured to generate a phoneme concatenation model of the at least one audio input representation based on a phoneme transcription; and
an adaptation component executing on the hardware processor, the adaptation component configured to generate a first word model of the at least one audio input based on the phoneme concatenation model.

2. The isolated word training system of claim 1, wherein the adaptation component is further configured to generate a second word model based on the first word model and at least one additional audio input representation.

3. The isolated word training system of claim 1, further comprising:
a phoneme model database that includes the one or more stored phoneme models, each of the one or more stored phoneme models being a pre-trained Hidden Markov Model.

4. The isolated word training system of claim 1, wherein the recognition component is configured to generate the phoneme concatenation model by:
decoding feature vectors of the at least one audio input using the one or more stored phoneme models to generate the phoneme transcription that comprises one or more phoneme identifiers;
selecting a subset of phoneme identifiers from the phoneme transcription; and
selecting corresponding phoneme models from a phoneme model database for each phoneme identifier in the subset as the phoneme concatenation model.

5. The isolated word training system of claim 4, further comprising:
a feature extraction component configured to:
derive speech features of speech of the at least one audio input; and
generate the feature vectors based on the speech features.

6. The isolated word training system of claim 5, further comprising:
a voice activity detection component configured to:
detect an onset of the speech;
determine a termination of the speech; and
provide the speech to the feature extraction component.

7. The isolated word training system of claim 1, wherein the adaptation component is configured to generate the first word model by at least one of:
removing one or more phonemes from the phoneme concatenation model;
combining one or more phonemes of the phoneme concatenation model;
adapting one or more state transition probabilities of the phoneme concatenation model;
adapting an observation symbol probability distribution of the phoneme concatenation model; or
adapting the phoneme concatenation model as a whole.

8. An electronic device that comprises:
a first processing circuit configured to:
receive a user-specified wake-up phrase that is previously unassociated with the electronic device as a wake-up phrase,
generate a phoneme concatenation model of the user-specified wake-up phrase, and
generate a word model of the user-specified wake-up phrase based on the phoneme concatenation model; and
a second processing circuit configured to:
detect audio activity of the user, and
determine if the user-specified wake-up phrase is present within the audio activity based on the word model.

9. The electronic device of claim 8, wherein the first processing component is further configured to operate in a training mode of the electronic device, and
wherein the second processing component is further configured to:
operate in a stand-by mode of the electronic device, and
provide, in the stand-by mode, an indication to the electronic device to operate in a normal operating mode subsequent to a determination that the user-specified wake-up phrase is present in the audio activity.

10. The electronic device of claim 9, further comprising:
a memory component configured to:
buffer the audio activity and the user-specified wake-up phrase of the user; and
provide the audio activity or the user-specified wake-up phrase to at least one of a voice activity detector or an automatic speech recognition component.

11. The electronic device of claim 9, wherein the first processing component, in the training mode, is further configured to:
decode feature vectors of the at least one audio input using the one or more stored phoneme models to generate a phoneme transcription that comprises one or more phoneme identifiers;
select a subset of phoneme identifiers from the phoneme transcription; and
select corresponding phoneme models from a phoneme model database for each phoneme identifier in the subset as the phoneme concatenation model.

12. The electronic device of claim 11, wherein the first processing component, in the training mode, is further configured to:
derive speech features of the user-specified wake-up phrase; and
generate the feature vectors based on the speech features.

13. The electronic device of claim 9, wherein the second processing component, in the stand-by mode, is further configured to:
derive speech features of the audio activity;
generate feature vectors based on the speech features; and
determine if the user-specified wake-up phrase is present by comparing the feature vectors to the word model.

14. The electronic device of claim 8, wherein the first processing component is further configured to:
generate the first word model by at least one of:
removing one or more phonemes from the phoneme concatenation model;
combining one or more phonemes of the phoneme concatenation model;
adapting one or more state transition probabilities of the phoneme concatenation model;

adapting an observation symbol probability distribution of the phoneme concatenation model; or adapting the phoneme concatenation model as a whole.

15. The electronic device of claim 8, wherein the first processing component is further configured to update the word model based on the user-specified wake-up phrase in a subsequent audio input.

16. The electronic device of claim 8, further comprising:

a phoneme model database that includes one or more stored phoneme models, each of the one or more stored phoneme models being a pre-trained Hidden Markov Model.

17. A non-transitory computer-readable storage medium having program instructions recorded thereon that, when executed by an electronic device, perform a method for utilizing a user-specified wake-up phrase in the electronic device, the method comprising:

training the electronic device using the user-specified wake-up phrase, received from a user, to generate, at the electronic device, a phoneme transcription of the user-specified wake-up phrase that includes one or more phoneme identifiers and a phoneme concatenation model of the user-specified wake-up phrase based on stored phoneme models that correspond to the one or more phoneme identifiers, the user-specified wake-up phrase being previously unassociated with the electronic device as a wake-up phrase; and transitioning the electronic device from a stand-by mode to a normal operating mode subsequent to a detection, that is based on the word model, of the user-specified wake-up phrase.

18. The non-transitory computer-readable storage medium of claim 17, wherein training the electronic device using the user-specified wake-up phrase includes receiving the user-specified wake-up phrase from the user no more than three times.

\* \* \* \* \*